United States Patent
Hachisuka et al.

(10) Patent No.: US 6,433,540 B1
(45) Date of Patent: Aug. 13, 2002

(54) METHOD AND APPARATUS FOR TESTING COMPOSITE TYPE MAGNETIC HEAD HAVING A MAGNETORESISTIVE ELEMENT AND AN INDUCTIVE ELEMENT

(75) Inventors: Nozomu Hachisuka; Kenji Inage; Toshiaki Maeda, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/488,559

(22) Filed: Jan. 21, 2000

(30) Foreign Application Priority Data

Jan. 28, 1999 (JP) .............................. 11-020135

(51) Int. Cl.⁷ ...................... G01R 33/12; G01R 31/02; G11B 5/455; G11B 5/39
(52) U.S. Cl. ........................................ 324/210; 324/537
(58) Field of Search ................... 324/210, 212, 324/537

(56) References Cited

U.S. PATENT DOCUMENTS

| | | | |
|---|---|---|---|
| 5,134,366 A | * | 7/1992 | Kirk ........................... 324/210 |
| 5,479,098 A | | 12/1995 | Yokoyama et al. ......... 324/212 |
| 5,589,777 A | * | 12/1996 | Davis et al. ............. 324/210 X |
| 5,668,477 A | * | 9/1997 | Mahmoudian et al. ... 324/210 X |
| 5,721,488 A | | 2/1998 | Sakai et al. ................. 324/210 |
| 5,854,554 A | * | 12/1998 | Tomita et al. .............. 324/210 |
| 6,111,406 A | | 8/2000 | Garfunkel et al. .......... 324/210 |

FOREIGN PATENT DOCUMENTS

| | | |
|---|---|---|
| JP | 6-150264 | 5/1994 |
| JP | 10-294725 | 11/1998 |

* cited by examiner

Primary Examiner—Gerard R. Strecker
(74) Attorney, Agent, or Firm—Arent Fox Kintner Plotkin & Kahn

(57) ABSTRACT

A method for testing a composite type magnetic head having a MR element and an inductive element includes a current application step of applying a current to the inductive element, with applying no external magnetic field to the magnetic head, and a measurement step of measuring output characteristics of the MR element after the current application step is finished.

27 Claims, 7 Drawing Sheets

Fig. 4a POSITIVE POLARITY RECTANGULAR WAVE SHAPE CURRENT
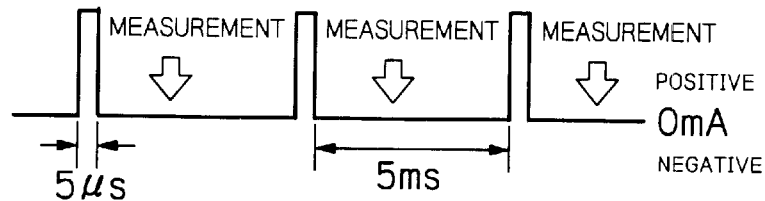
Fig. 4b ALTERNATING POLARITY RECTANGULAR WAVE SHAPE CURRENT
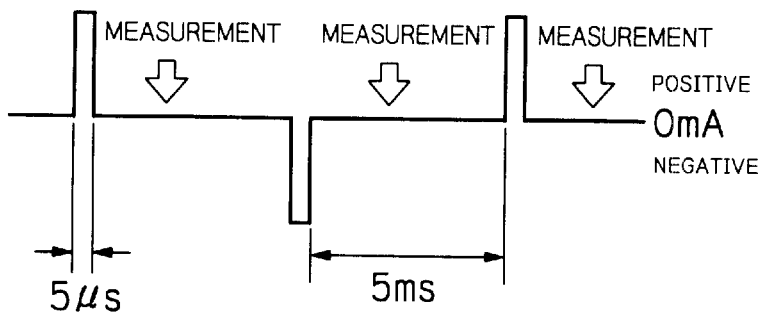
Fig. 4c NEGATIVE POLARITY RECTANGULAR WAVE SHAPE CURRENT
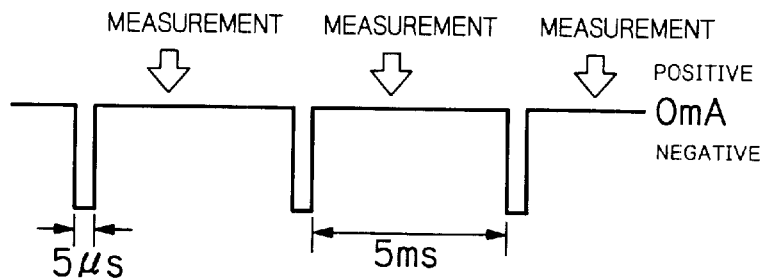
Fig. 4d HIGH FREQUENCY RECTANGULAR WAVE SHAPE CURRENT
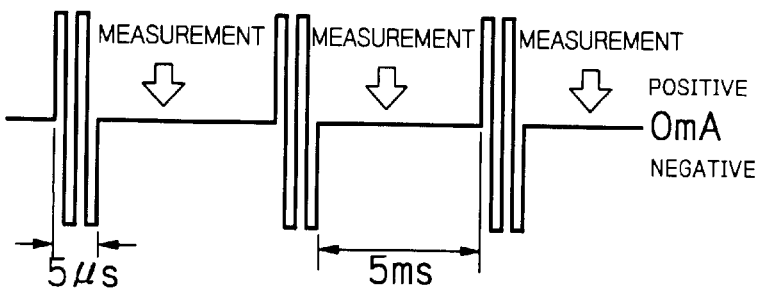

Fig. 5a POSITIVE POLARITY RECTANGULAR WAVE SHAPE CURRENT
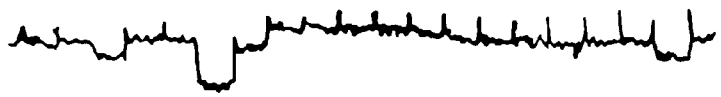
Fig. 5b ALTERNATING POLARITY RECTANGULAR WAVE SHAPE CURRENT
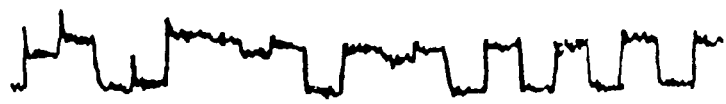
Fig. 5c NEGATIVE POLARITY RECTANGULAR WAVE SHAPE CURRENT
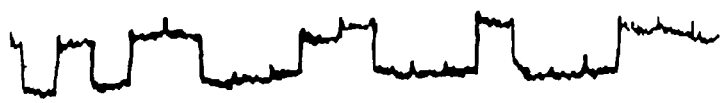
Fig. 5d HIGH FREQUENCY RECTANGULAR WAVE SHAPE CURRENT

Fig. 6a POSITIVE POLARITY RECTANGULAR WAVE SHAPE CURRENT
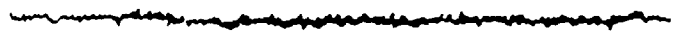
Fig. 6b ALTERNATING POLARITY RECTANGULAR WAVE SHAPE CURRENT
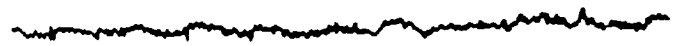
Fig. 6c NEGATIVE POLARITY RECTANGULAR WAVE SHAPE CURRENT
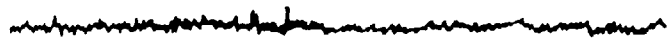
Fig. 6d HIGH FREQUENCY RECTANGULAR WAVE SHAPE CURRENT
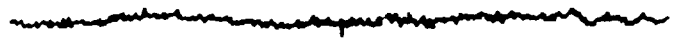

METHOD AND APPARATUS FOR TESTING COMPOSITE TYPE MAGNETIC HEAD HAVING A MAGNETORESISTIVE ELEMENT AND AN INDUCTIVE ELEMENT

FIELD OF THE INVENTION

The present invention relates to a method and apparatus for testing a composite type magnetic head which has a read head portion with a magnetoresistive effect (MR) element for reproducing data from a magnetic medium such as a magnetic disk, and a write head portion with an inductive element for recording data into the magnetic medium.

DESCRIPTION OF THE RELATED ART

The composite type magnetic heads described above have been broadly utilized as thin-film magnetic heads for reading data from and/or writing data into the magnetic medium such as the magnetic disk. Recently, a magnetic head with a giant magnetoresistive effect (GMR) element such as a spin-valve MR element or with a tunnel magnetoresistive effect (TMR) element has been developed to increase magnetic recording density, instead of a usual magnetic head with an anisotropic magnetoresistive effect (AMR) element.

At each test after manufacturing such a magnetic head, it is necessary to confirm that the finished magnetic head with a MR element is a good article and may not produce any inherent noise such as Barkhausen noise. Japanese Patent Unexamined Publication No.6 (1994)-150264 of the same assignee as that of the present application discloses a MR head testing method. In this testing method, an external alternating magnetic field is applied, in a direction perpendicular to an Air Bearing Surface (ABS), to a plurality of MR heads which are aligned on a head block and are not yet individually separated, and electromagnetic transfer characteristics of each of the MR heads under the varying external magnetic field is measured. By means of this conventional testing method, whether Barkhausen noise is produced or not can be easily checked.

U.S. Pat. No. 5,721,488 of the same assignee as that of the present application discloses an improved MR head testing method. In this testing method, alternating leakage magnetic field with a high frequency excited by a write current flowing through an inductive element is applied to the MR element in addition to external alternating magnetic field which is applied to the MR element in a direction perpendicular to the ABS of the head block, and electromagnetic conversion characteristics of each of the MR heads under the varying external and leakage magnetic fields is measured. By means of this testing method disclosed in the U.S. patent, possible Barkhausen noise can be detected with a high probability.

These known testing methods using the electromagnetic conversion characteristics measuring device can be used for detecting whether Barkhausen noise is produced or not but cannot be applied for detecting instability of output of the MR element, which is different from abnormal output of the MR element due to Barkhausen noise. In fact, when outputs of the MR element of the composite type magnetic head are repeatedly measured many times by means of the electromagnetic conversion characteristics measuring device, the output wave shapes of the MR element may sometimes vary due to some reason and thus the same output level cannot always be obtained, resulting poor reproducibility.

Therefore, according to the conventional testing method, it is impossible to detect instability of output of the MR element except when the test is repeated many times to increase the probability of the detection. However, repeating the test numerous times will lower the manufacturing efficiency of the head.

Particularly, the composite type magnetic head with the GMR element or the TMR element may very easily trigger the output instability because such magnetic head has high sensitivity and a complicated structure and therefore is susceptible to its environment.

In order to solve the above-mentioned problems with respect to instability of the MR output, the inventors of this application have already proposed a method for testing a composite type magnetic head having a MR element and an inductive element, by applying a first current with one polarity to the inductive element, by measuring output characteristics of the MR element, by applying a second current with the other polarity to the inductive element, and by measuring the output characteristics of the MR element (U.S. Ser. No. 09/196,442, now pending).

It should be noted that it is very important for a magnetic head with a MR element to measure instability of an output of the MR element around its bias point or a point at which the magnetic field in the electromagnetic conversion characteristics is zero, otherwise instability would be caused by the shield layer of the MR element. This is because the bias point is located at the center of the output signal from the MR element and thus it is impossible to obtain a correct output signal from the MR element if the bias point is offset.

The conventional testing method with application of external alternating magnetic field to the MR element can measure a deviation of such bias point. However, in order to measure the bias point deviation according to the conventional testing method, it is necessary to find a point of zero magnetic field by using a magnetic field generation device. This causes a complicated structure of the testing apparatus and requires an extreme amount of time.

SUMMARY OF THE INVENTION

It is therefore an object of the present invention to provide a method and apparatus for testing a composite type magnetic head, whereby an easy and reliable test can be attained with respect to the instability of the output of a MR element around its bias point.

According to the present invention, a method for testing a composite type magnetic head having a MR element and an inductive element includes a current application step of applying a current to the inductive element, with applying no external magnetic field to the magnetic head, and a measurement step of measuring output characteristics of the MR element after the current application step is finished.

Output characteristics of the MR element is not merely measured but is measured under a condition wherein possible instability of the output of the MR element around its bias point will be intentionally induced by forcefully applying to the inductive element a current which will change an initial magnetization state of a shield layer for the MR element. According to the present invention, particularly, since the output voltage characteristics of the MR element is measured after the current is applied to the inductive element without an external magnetic field, being applied, the wave shape of the output voltage from the MR element directly indicates the wave shape around the bias point of the MR element. Thus, the performance evaluation of the magnetic head over its actual operation region can be executed very easily. Furthermore, since any influence due to the applied external magnetic field such as temporal suppression of occurred output instability due to the applied external magnetic field is not exerted, the evaluation of the head itself can be performed correctly and certainly.

It is preferred that the application step and the measurement step are repeated at least twice.

It is preferred that the current application step includes an application step of applying a rectangular wave shape current with a predetermined polarity such as positive or negative polarity to the inductive element.

It is also preferred that the current application step includes an application step of applying a rectangular wave shape current with an alternating polarity to the inductive element.

It is also preferred that the current application step includes an application step of applying a high frequency rectangular wave shape current to the inductive element.

According to the present invention, also, an apparatus for testing a composite type magnetic head having a MR element and an inductive element, includes a first current application unit for applying a current to the inductive element, with applying no external magnetic field to the magnetic head, a second current application unit for applying a sense current to the MR element, and a measurement unit for measuring output characteristics of the MR element by receiving output voltage from the MR element after the application of the current to the inductive element from the first current application unit is finished while the sense current from the second current application unit is flowing.

Furthermore, according to the present invention, an apparatus for testing a composite type magnetic head having a MR element with terminals and an inductive element with terminals, includes a probe unit for electrically contacting to the terminals of the MR element and to the terminals of the inductive element, a first current application unit for applying a current to the inductive element through the probe unit, with applying no external magnetic field to the magnetic head, a second current application unit for applying a sense current to the MR element through the probe unit, and a measurement unit for measuring output characteristics of the MR element by receiving output voltage from the MR element through the probe unit after the application of the current to the inductive element from the first current application unit is finished while the sense current from the second current application unit is flowing.

The output characteristics of the MR element is measured after the application of the current to the inductive element from the first cent application unit with applying no external magnetic field is finished. Thus, the wave shape of the output voltage from the MR element directly indicates wave shape around the bias point of the MR element. As a result, performance evaluation of the magnetic head over its actual operation region can be executed very easily. Furthermore, since any influence due to the applied external magnetic field such as temporal suppression of occurred output instability due to the applied external magnetic field is not exerted, evaluation of the head itself can be performed correctly and certainly. In addition, since it is not necessary to apply external magnetic field, apparatus configuration becomes simpler.

It is preferred that the application unit and the measurement unit repeat the application of the current to inductive element and the measurement of output characteristics of the MR element after the application of the current is finished, at least twice.

It is preferred that the first current application unit includes an application unit for applying a rectangular wave shape current with a predetermined polarity such as positive or negative polarity to the inductive element.

It is also preferred that the first current application unit includes an application unit for applying a rectangular wave shape current with an alternating polarity to the inductive element.

It is also preferred that the first current application unit includes an application unit for applying a high frequency rectangular wave shape current to the inductive element.

Further objects and advantages of the present invention will be apparent from the following description of the preferred embodiments of the invention as illustrated in the accompanying drawings.

DESCRIPTION OF THE PREFERRED EMBODIMENTS

FIGS. 4a to 4d are views illustrating various ways for applying current to an inductive element head and various ways for measuring output characteristics of a MR element;

FIGS. 5a to 5d are views illustrating wave shapes of output voltages from a MR element of a defective magnetic head having output instability around its bias point when various currents are applied through the magnetic head;

Figure 7:
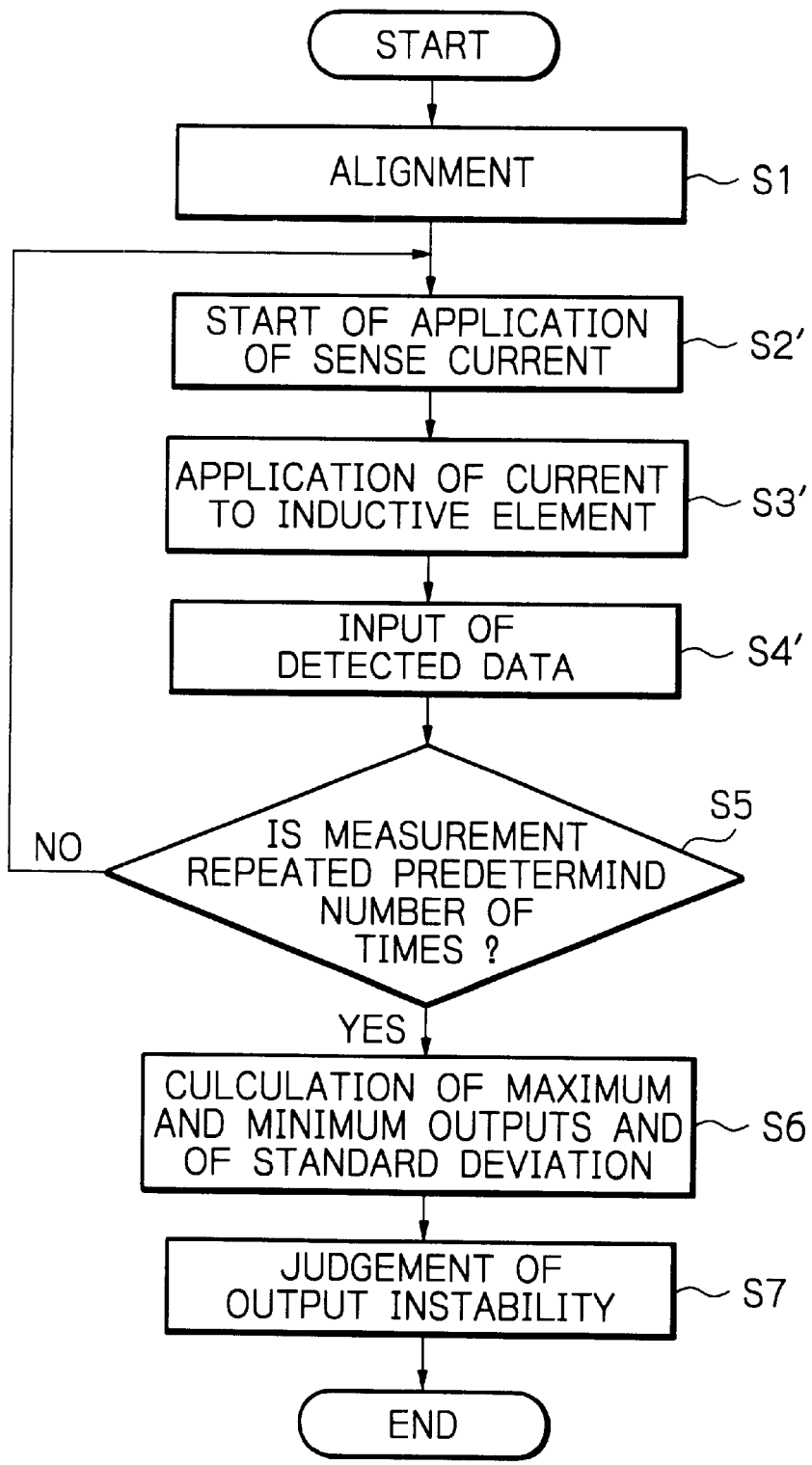

FIGS. 6a to 6d are views illustrating wave shapes of output voltages from a MR element of a good magnetic head having no output instability around its bias point when various currents are applied through the magnetic head; and FIG. 7 is a flow chart schematically illustrating a part of control program of a computer of another embodiment of an apparatus for testing a composite type magnetic head, according to the present invention.

DESCRIPTION OF THE PREFERRED EMBODIMENTS

Figure 1:
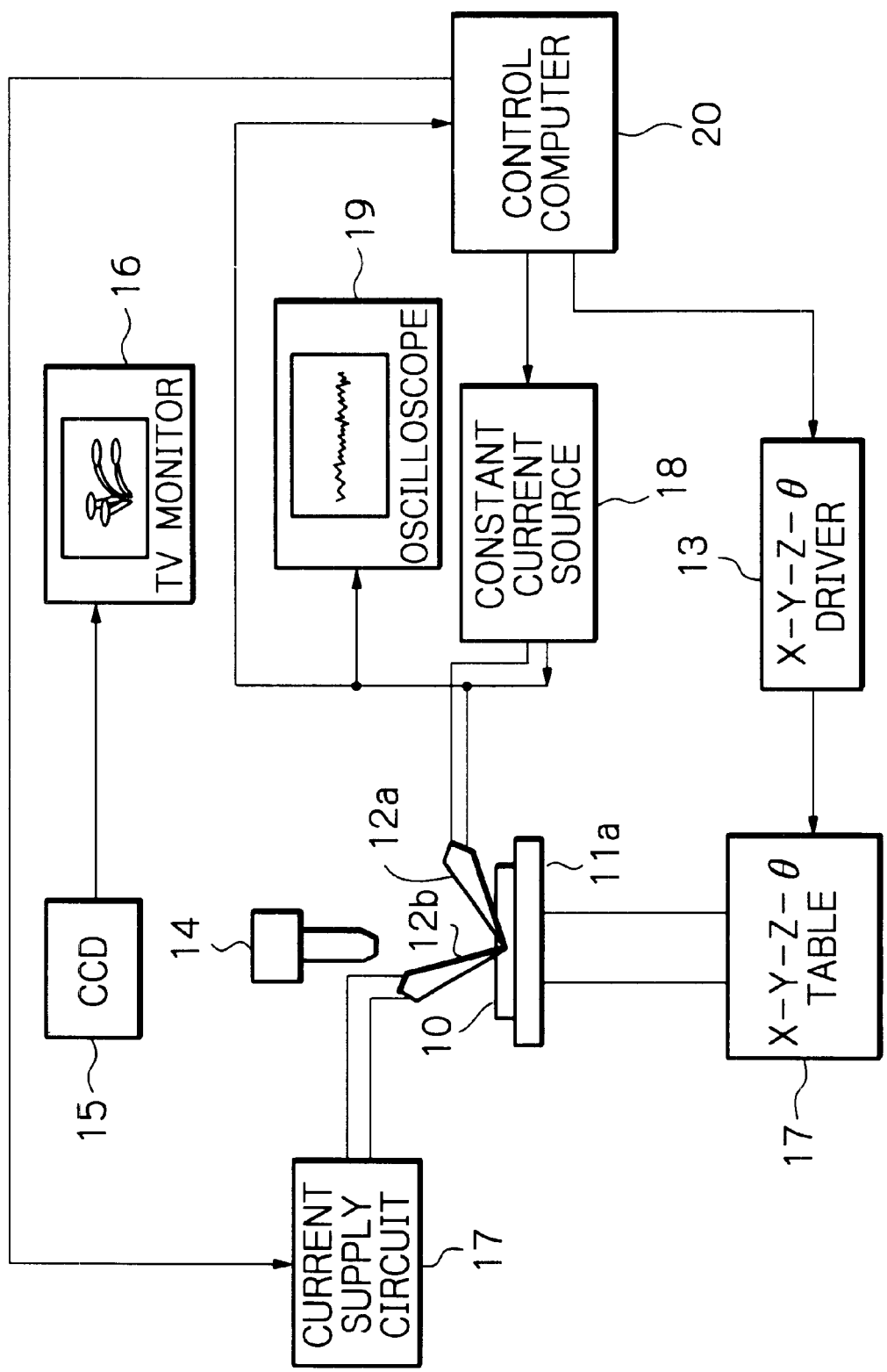
FIG. 1 is a block diagram schematically showing a circuit structure of a preferred embodiment of an apparatus for testing a composite type magnetic head, according to the present invention.

FIG. 1 schematically illustrates the embodiment of the apparatus for testing a composite type magnetic head including a write head portion with the inductive element and a read head portion with the MR element.

In the figure, reference numeral 10 denotes a head block (bar) with a plurality of aligned composite type magnetic heads that are not individually separated. This head block 10 is arranged by forming a large number of composite type magnetic heads in matrix on a wafer according to thin-film technology, by cutting the wafer into bar shaped blocks so that each block has the aligned magnetic heads, and by grinding an Air Bearing Surface (ABS) 10a (FIG. 3) of the head block 10 so as to adjust gap-depth (MR height) of the heads.

The head block 10 is temporally fixed on a platform 1ia of a X-Y-Z-θ table 17.

Figure 3:
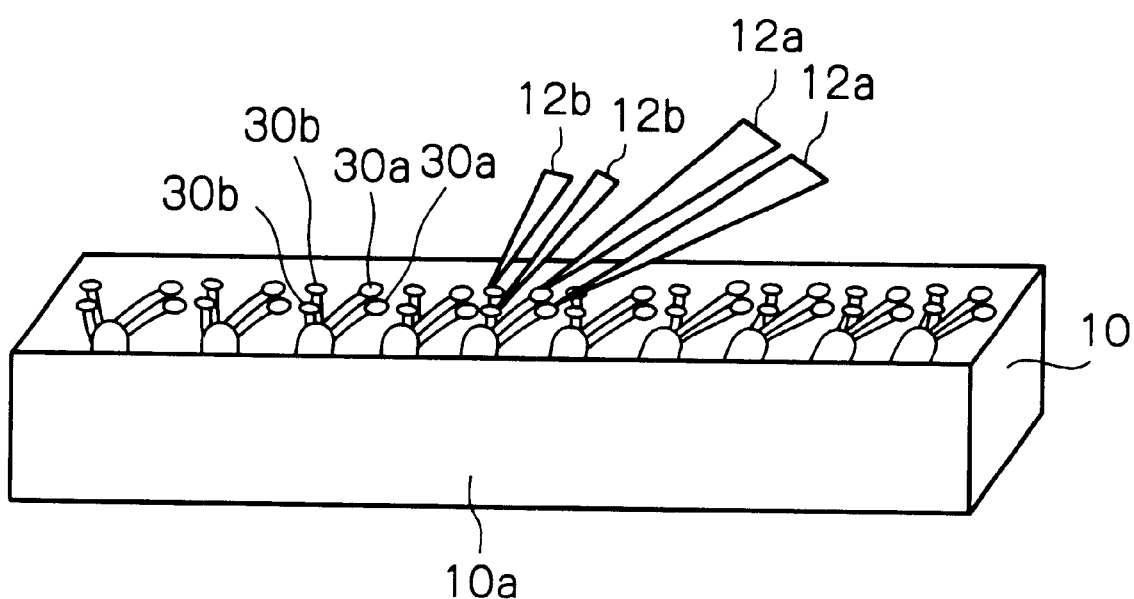
FIG. 3 is a view illustrating electrodes of the tested magnetic head on a head block and probe pins of the test apparatus.

First probe pins 12a are fixed at a standstill position and the head block 10 is aligned with the first probe pins 12a. This alignment is performed by the X-Y-Z-θ table 17 and driven by a X-Y-Z-θ driver 13 so that the first probe pins 12a are in electrical contact with the output terminals 30a of the MR element of the magnetic head, which can be tested, and are formed on the head block 10, as illustrated in FIG. 3. The alignment of the output terminals 30a with respect to the first probe pins 12a can be monitored by means of a CCD camera 15 which picks up image of this alignment portion via an optical system 14 and by means of a TV monitor 16.

Second probe pins 12b are also fixed at a standstill position and the head block 10 is aligned with the second probe pins 12b. This alignment is also performed by the X-Y-Z-θ table 17 driven by the X-Y-Z-θ driver 13 so that the second probe pins 12b, which are electrically contacted with the input terminals 30b of the inductive element of the magnetic head to be tested, and are formed on the head block 10, as illustrated in FIG. 3. The alignment of the input terminals 30b with respect to the second probe pins 12b can also be monitored by means of the CCD camera 15 and the TV monitor 16. In practice, the first and second probe pins 12a and 12b are integral with each other and thus the alignment of the probe pins 12a and 12b with respect to the respective terminals 30a and 30b can be simultaneously performed.

The second probe pins 12b are electrically connected to a current supply circuit 17 which can control polarity and the level of providing current. Thus, from this current supply circuit 17, one of various kinds of current with positive and/or negative polarities is provided to the inductive element of the magnetic head via the second probe pins 12b.

The first probe pins 12a are electrically connected to a constant current source 18 for supplying a sense current to the MR element. The first probe pins 12a are also connected to an oscilloscope 19 for displaying wave shape of an output voltage from the MR element and to the control computer 20 which receives and analyzes this output voltage.

The X-Y-Z-θ driver 13, the constant current source 18 and the current supply circuit 17 are connected to the computer 20 and perform predetermined processes in response to commands from the computer 20.

Figure 2:
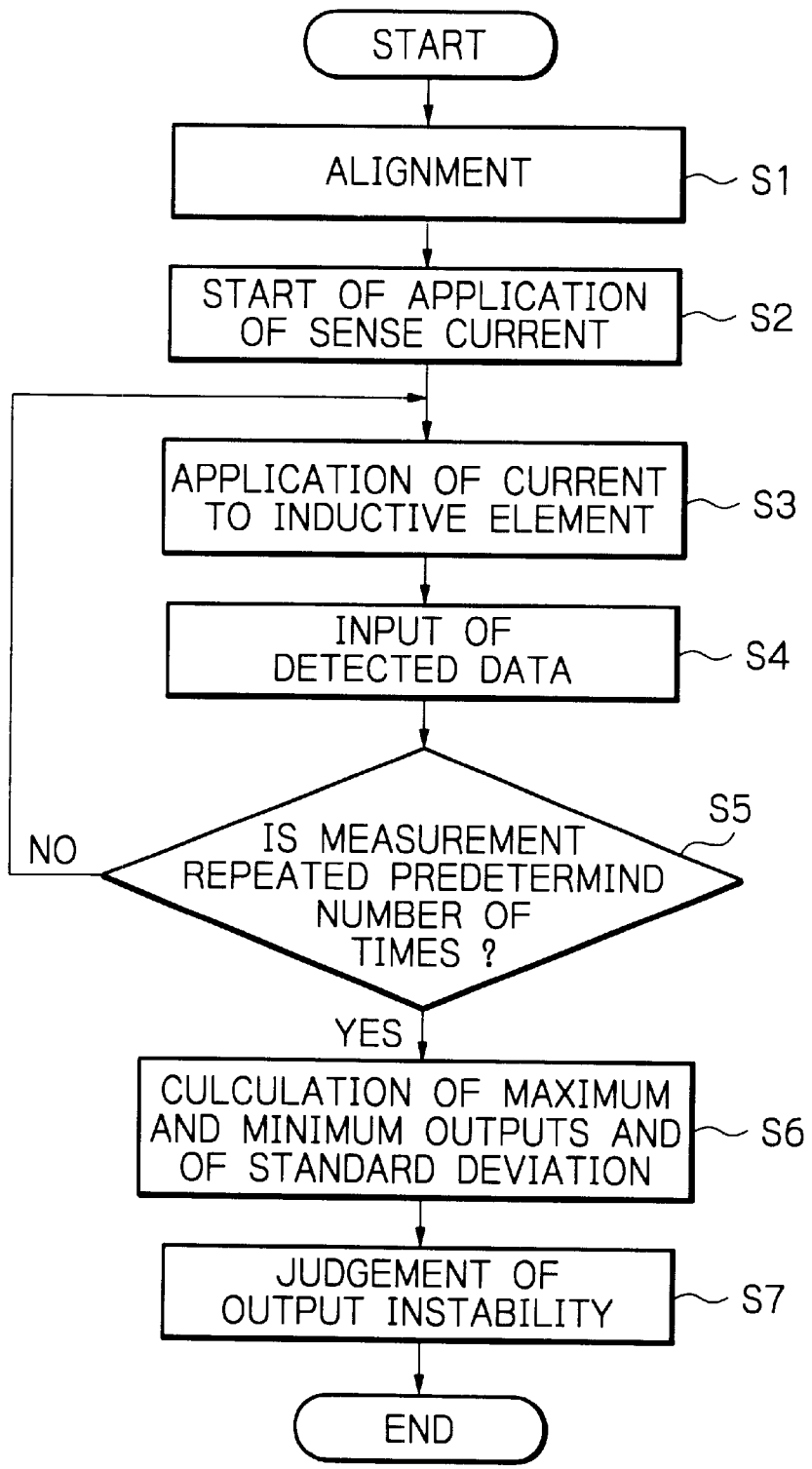
FIG. 2 is a flow chart schematically illustrating a part of control program of a computer shown in FIG. 1.

Referring to FIG. 2 which is a flow chart schematically illustrating a part of a control program for the computer 20. The method of testing the composite type magnetic head will be described in detail.

First, at step S1, alignment of the output terminals of the MR element and the input terminals of the inductive element of the magnetic head to be tested on the head block 10 which is fixed on the platform 11a of the X-Y-Z-θ table 17, with the first and second probe pins 12a and 12b, respectively, is executed. This alignment will be performed by moving the X-Y-Z-θ table 17 by means of the X-Y-Z-θ driver 13 in accordance with instruction from the computer 20 using a well known alignment technique.

At step S2, application of the sense current to the MR element of the magnetic head to be tested is started by providing instruction to the constant current source 18 from the computer 20. No external magnetic field is applied to the head block 10.

As illustrated in FIG. 3, the first probe pins 12a are electrically contacted with the output terminals 30a of the MR element of the magnetic head to be tested and the second probe pins 12b are electrically contacted with the input terminals 30b of the inductive element of the magnetic head to be tested.

Then, at step S3, current is applied to the inductive element of the magnetic head, which is tested by providing instruction to the current supply circuit 17 from the computer 20. In this embodiment, the current is a single rectangular wave shape current with one polarity such as positive polarity and with a pulse width of $5\mu$ seconds for example. The amplitude or level of the current is selected to the maximum permissible current level for the inductive element or less.

After the application of the such rectangular current to the inductive element is finished, at step S4, the output voltage across the output terminals of the MR element, corresponding to resistance of the MR element, is detected under a condition where the sense current is applied to the MR element. The detected output voltage is provided to the computer 20 and then A/D converted into digital input data.

At the next step S5, it is judged whether the measurement processes at steps S3 and S4 are repeated by a predetermined number of times, for example 100 times, or not. If not, the program will return to step S3.

Then, at step S6, the input data is analyzed. Namely, the computer 20 calculates, from the input data, the standard deviation σ of the output voltage, the maximum value and the minimum value of the output voltage.

After these calculations are executed, whether output instability around the bias point of this magnetic head exists or not is judged, depending upon the calculated standard deviation σ, maximum value and the minimum value. Thus, whether the tested magnetic head is a good article or not at step S7 is determined. The increased number of executed measurements will result in the improved probability of detecting any output instability.

FIG. 4a illustrates the way for applying current to the inductive element head and the way for measuring output characteristics of the MR element according to the above-mentioned embodiment. Namely, in this embodiment, the application of a rectangular wave shape current which falls to zero from positive polarity to the inductive element and then measurement of output characteristics of the MR element after a predetermined period of time has lapsed from each application of the current are repeatedly executed so as to judge whether instability of the output of the MR element around its bias point has occurred or not.

In stead of the positive polarity rectangular wave shape current, polarity alternated rectangular wave shape current can be used as shown in FIG. 4b. Namely, application of a rectangular wave shape current which falls to zero from one polarity to the inductive element, measurement of output characteristics of the MR element after a predetermined period of time has lapsed from the application of this one polarity current, application of a rectangular wave shape current which falls to zero from the other polarity to the inductive element, and measurement of output characteristics of the MR element after a predetermined period of time has lapsed from the application of this the other polarity current may be repeatedly executed, so as to judge whether instability of the output of the MR element around its bias point has occurred or not.

According to the present invention, output characteristics of the MR element are measured under a condition wherein possible instability of the output of the MR element around its bias point will be intentionally induced by forcefully applying to the inductive element a current which will change an initial magnetization state of a shield layer for the MR element. However, it is impossible to previously know that, for each MR element, which polarity of the applied current will change the initial magnetization state of the shield layer. Thus, in this modification, the output characteristic of each MR element is measured each time a current with different polarity is applied to the inductive element. As a result, possible output instability of the MR element around its bias point can be certainly detected.

The wave shape and also the level of the current applied to the inductive element may be different between the positive and negative polarities. In other words, any current with a sufficient level and a sufficient duration which causes the shield layer of the MR element to saturate and to change its initial magnetization state can be used as the current applied to the inductive element.

In another modification, as shown in FIG. 4c, application of a rectangular wave shape current which falls to zero from negative polarity to the inductive element and measurement of output characteristics of the MR element after a predetermined period of time has lapsed from each application of the current may be repeatedly executed so as to judge whether instability of the output of the MR element around its bias point is occurred or not.

Alternately, instead of the single rectangular wave shape current, a high frequency rectangular wave shape current with a predetermined frequency such as 5 MHz may be used, as shown in FIG. 4d. Measurement of output characteristics of the MR element is executed when a predetermined period of time has lapsed after the applied high frequency rectangular current finally falls to zero so as to judge whether instability of the output of the MR element around its bias point is occurred or not.

FIGS. 5a to 5d and FIGS. 6a to 6d illustrate wave shapes of output voltages from MR elements of actual magnetic heads when these heads are tested using the currents shown in FIGS. 4a to 4d, respectively. Namely, FIGS. 5a and 6a show wave shapes of output voltages from the MR elements when the positive polarity rectangular shape current is applied to the inductive element. FIGS. 5b and 6b show output voltage wave shapes when the polarity alternated rectangular shape current is applied. FIGS. 5c and 6c show output voltage wave shapes when the negative polarity rectangular shape current is applied. FIGS. 5d and 6d show output voltage wave shapes when the high frequency rectangular shape current is applied. FIGS. 5a to 5d illustrate a case where a defective magnetic head with output instability around its bias point is used, and FIGS. 6a to 6d illustrate a case where a good magnetic head without output instability around its bias point is used. As will be apparent from these figures, the defective magnetic head with output instability around its bias point has confused wave shapes in its output voltages. Thus, this testing method will provide very easy detection of a defective head.

As described in detail, according to the present invention, output characteristics of the MR element are not merely measured, but are measured under a condition wherein possible instability of the output of the MR element around its bias point will be intentionally induced by forcefully applying to the inductive element a rectangular wave shape current which will change an initial magnetization state of a shield layer for the MR element. It is important, according to the invention, that since the output voltage characteristics of the MR element are measured after the rectangular wave shape current is applied to the inductive element with applying no external magnetic field, the wave shape of the output voltage from the MR element directly indicates wave shape around the bias point of the MR element. Thus, performance evaluation of the magnetic head over its actual operation region can be executed very easily. Furthermore, since any influence due to the applied external magnetic field such as temporal suppression of occurred output instability due to the applied external magnetic field is not exerted, evaluation of the head itself can be performed correctly and certainly.

FIG. 7 schematically illustrates a part of control program of a computer of another embodiment of an apparatus for testing a composite type magnetic head, according to the present invention.

In the aforementioned embodiment, application of the sense current to the MR element is started before the measurement of the output characteristics and is maintained during the measurement. Whereas, in this embodiment, the sense current is turned on and off at each measurement. That is, in this embodiment, the sense current to the MR element of the magnetic head that is to be tested is applied only when the measurement is executed by providing an instruction to the constant current source 18 from the computer 20, as shown at step S2' in FIG. 7. In other words, the application of the sense current is started at the step S2' and finished at step S4' through step S3'. Since the sense current is turned on and off at each measurement, possible output instability of the MR element around its bias point may be induced in response to the turning on and off of the sense current.

The operations at other steps in the flow chart of FIG. 7 are the same as these of the flow chart of FIG. 2.

The output characteristics of the MR element may be measured during the current is flowing, not after the current is applied and finished.

Various conditions in the above-mentioned actual tests, particularly kind, wave shape, level (amplitude), frequency and application period of time of the current applied to the inductive elements are mere examples. Therefore, the present invention can be actually embodied without being limited to these specific examples.

In the aforementioned embodiments, since the testing procedure is executed during the head block stage before each of the magnetic heads is individually separated from the head block, a period of time for manufacturing a magnetic head with its testing process can be extremely shortened. The evaluation and selection time can be also extremely reduced.

A similar testing procedure can be executed during a wafer stage before making the head block, if it is done after the read head portion with the MR element and its shield layer and the write head portion with the inductive element.

The testing procedure may also be done after each of the magnetic heads is individually separated from the head block, after the magnetic head is assembled with a suspension or after the head and suspension assembly is attached in a magnetic disk drive device.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for testing a composite type magnetic head having a magnetoresistive effect element and an inductive element, said method comprising:

a current application step of applying a current to said inductive element, with applying no external magnetic field to said magnetic head;

a measurement step of measuring output of said magnetoresistive effect element after said current application step is finished; and a judgment step of judging whether output instability around a bias point of said magnetoresistive effect element exists, depending upon the output measured.

2. The method as claimed in claim 1, wherein said current application step includes an application step of applying a rectangular wave shape current with a predetermined polarity to said inductive element.

3. The method as claimed in claim 2, wherein said application step and said measurement step are repeated at least twice.

4. The method as claimed in claim 3, wherein said rectangular wave shape current has positive polarity.

5. The method as claimed in claim 3, wherein said rectangular wave shape current has negative polarity.

6. The method as claimed in claim 1, wherein said current application step includes an application step of applying a rectangular wave shape current with an alternating polarity to said inductive element.

7. The method as claimed in claim 6, wherein said application step and said measurement step are repeated at least twice.

8. The method as claimed in claim 1, wherein said current application step includes an application step of applying a high frequency rectangular wave shape current to said inductive element.

9. The method as claimed in claim 8, wherein said application step and said measurement step are repeated at least twice.

10. An apparatus for testing a composite type magnetic head having a magnetoresistive effect element and an inductive element, comprising:
a first current application means for applying a current to said inductive element, with applying no external magnetic field to said magnetic head;
a second current application means for applying a sense current to said magnetoresistive effect element;
a measurement means for measuring output voltage of said magnetoresistive effect element after the application of said current to said inductive element from said first current application means is finished while said sense current from said second current application means is flowing;
a judgment means for judging whether output instability around a bias point of said magnetoresistive effect element exists, depending upon the measured output voltage.

11. The apparatus as claimed in claim 10, wherein said first current application means includes an application means for applying a rectangular wave shape current with a predetermined polarity to said inductive element.

12. The apparatus as claimed in claim 11, wherein said application means and said measurement means repeat the application of said current to inductive element and the measurement of output characteristics of said magnetoresistive effect element after the application of said current is finished, at least twice.

13. The apparatus as claimed in claim 11, wherein said rectangular wave shape current has positive polarity.

14. The apparatus as claimed in claim 11, wherein said rectangular wave shape current has negative polarity.

15. The apparatus as claimed in claim 10, wherein said first current application means includes an application means for applying a rectangular wave shape current with an alternating polarity to said inductive element.

16. The apparatus as claimed in claim 15, wherein said application means and said measurement means repeat the application of said current to inductive element and the measurement of output characteristics. of said magnetoresistive effect element after the application of said current is finished, at least twice.

17. The apparatus as claimed in claim 10, wherein said first current application means includes an application means for applying a high frequency rectangular wave shape current to said inductive element.

18. The apparatus as claimed in claim 17, wherein said application means and said measurement means repeat the application of said current to inductive element and the measurement of output characteristics of said magnetoresistive effect element after the application of said current is finished, at least twice.

19. An apparatus for testing a composite type magnetic head having a magnetoresistive effect element with terminals and an inductive element with terminals, comprising:
probe means for electrically contacting to said terminals of said magnetoresistive effect element and to said terminals of said inductive element;
a first current application means for applying a current to said inductive element through said probe means, with applying no external magnetic field to said magnetic head;
a second current application means for applying a sense current to said magnetoresistive effect element through said probe means;
a measurement means for measuring output voltage of said magnetoresistive effect element through said probe means after the application of said current to said inductive element from said first current application means is finished while said sense current from said second current application means is flowing;
a judgment means for judging whether output instability around a bias point of said magnetoresistive effect element exists, depending upon the measured output voltage.

20. The apparatus as claimed in claim 19, wherein said first current application means includes an application means for applying a rectangular wave shape current with a predetermined polarity to said inductive element.

21. The apparatus as claimed in claim 20, wherein said application means and said measurement means repeat the application of said current to inductive element and the measurement of output characteristics of said magnetoresistive effect element after the application of said current is finished, at least twice.

22. The apparatus as claimed in claim 20, wherein said rectangular wave shape current has positive polarity.

23. The apparatus as claimed in claim 20, wherein said rectangular wave shape current has negative polarity.

24. The apparatus as claimed in claim 19, wherein said first current application means includes an application means for applying a rectangular wave shape current with an alternating polarity to said inductive element.

25. The apparatus as claimed in claim 24, wherein said application means and said measurement means repeat the application of said current to inductive element and the measurement of output characteristics of said magnetoresistive effect element after the application of said current is finished, at least twice.

26. The apparatus as claimed in claim 19, wherein said first current application means includes an application means for applying a high frequency rectangular wave shape current to said inductive element.

27. The apparatus as claimed in claim 26, wherein said application means and said measurement means repeat the application of said current to inductive element and the measurement of output characteristics of said magnetoresistive effect element after the application of said current is finished, at least twice.

* * * * *